United States Patent [19]
Doumanidis

[11] Patent Number: 5,552,575
[45] Date of Patent: Sep. 3, 1996

[54] SCAN WELDING METHOD AND APPARATUS

[75] Inventor: Charalabos C. Doumanidis, Somerville, Mass.

[73] Assignee: Tufts University, Medford, Mass.

[21] Appl. No.: 277,384

[22] Filed: Jul. 19, 1994

Related U.S. Application Data

[63] Continuation-in-part of Ser. No. 275,840, Jul. 15, 1994, abandoned.

[51] Int. Cl.$^6$ .................................... B23K 9/12
[52] U.S. Cl. .................. 219/124.34; 219/121.14; 219/121.64; 219/137 R
[58] Field of Search ............... 219/124.34, 125.1, 219/125.12, 137 PS, 137 R, 121.64, 121.63, 121.14, 121.13

[56] References Cited

U.S. PATENT DOCUMENTS

| | | | |
|---|---|---|---|
| 3,591,761 | 7/1971 | Bederman et al. | 219/69 |
| 3,777,101 | 12/1973 | Gwin et al. | 219/60 |
| 4,484,059 | 11/1984 | Lillquist | 219/130.01 |
| 4,504,721 | 3/1985 | Inoue | 219/69 |
| 4,532,404 | 7/1985 | Boillot et al. | 219/124.34 |
| 4,556,778 | 12/1985 | Jackson | 219/125.11 |
| 4,590,355 | 5/1986 | Nomura et al. | 219/125.12 |
| 4,594,497 | 6/1986 | Takahashi et al. | 219/124.34 |
| 4,689,469 | 8/1987 | Detriché et al. | 219/125.12 |
| 4,877,940 | 10/1989 | Bangs et al. | 219/124.34 |
| 4,965,431 | 10/1990 | Monteleone | 219/123 |
| 4,975,558 | 12/1990 | Lukens et al. | 219/124.34 |
| 5,107,093 | 4/1992 | Ekelöf et al. | 219/124.34 |
| 5,166,495 | 11/1992 | Ekelöf et al. | 219/124.34 |
| 5,233,150 | 8/1993 | Schneebeli et al. | 219/76.14 |
| 5,294,771 | 3/1994 | Pratt | 219/121.14 |

*Primary Examiner*—Clifford C. Shaw
*Attorney, Agent, or Firm*—Hamilton, Brook, Smith & Reynolds, P.C.

[57] ABSTRACT

A single weld head, torch, is time-shared to implement any specified distributed heat input by scanning along a weld centerline and a region surrounding the centerline while adjusting the torch intensity accordingly on its path. The scan welding torch reciprocates rapidly on dynamically scheduled trajectories while power to the torch is modulated in real-time to provide a regulated heat input distribution in the weld region and on the weld centerline. The method generates a smooth and uniform temperature field, and deposits the full length of the weld bead simultaneously at a controlled solidification rate. As a result, grain interlacing on the bead interface in conjunction with a regulated material microstructure yield improved tensile joint strength.

40 Claims, 13 Drawing Sheets

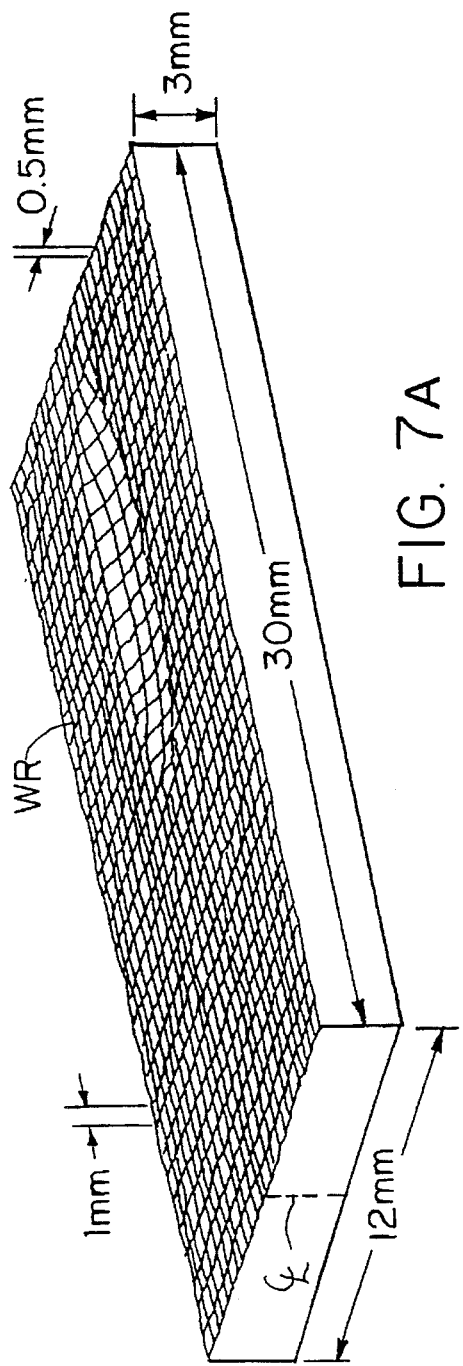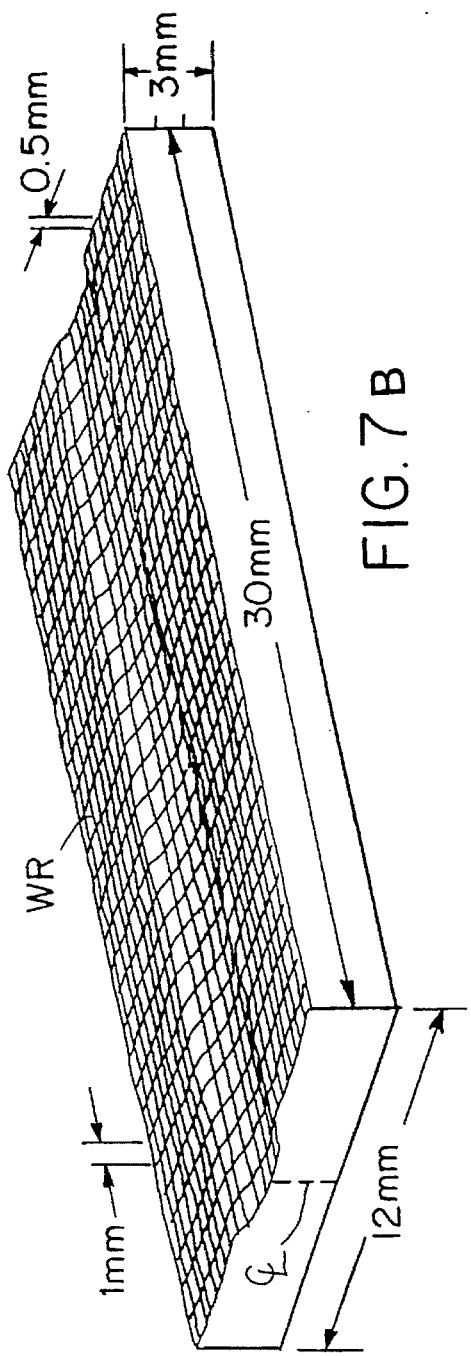

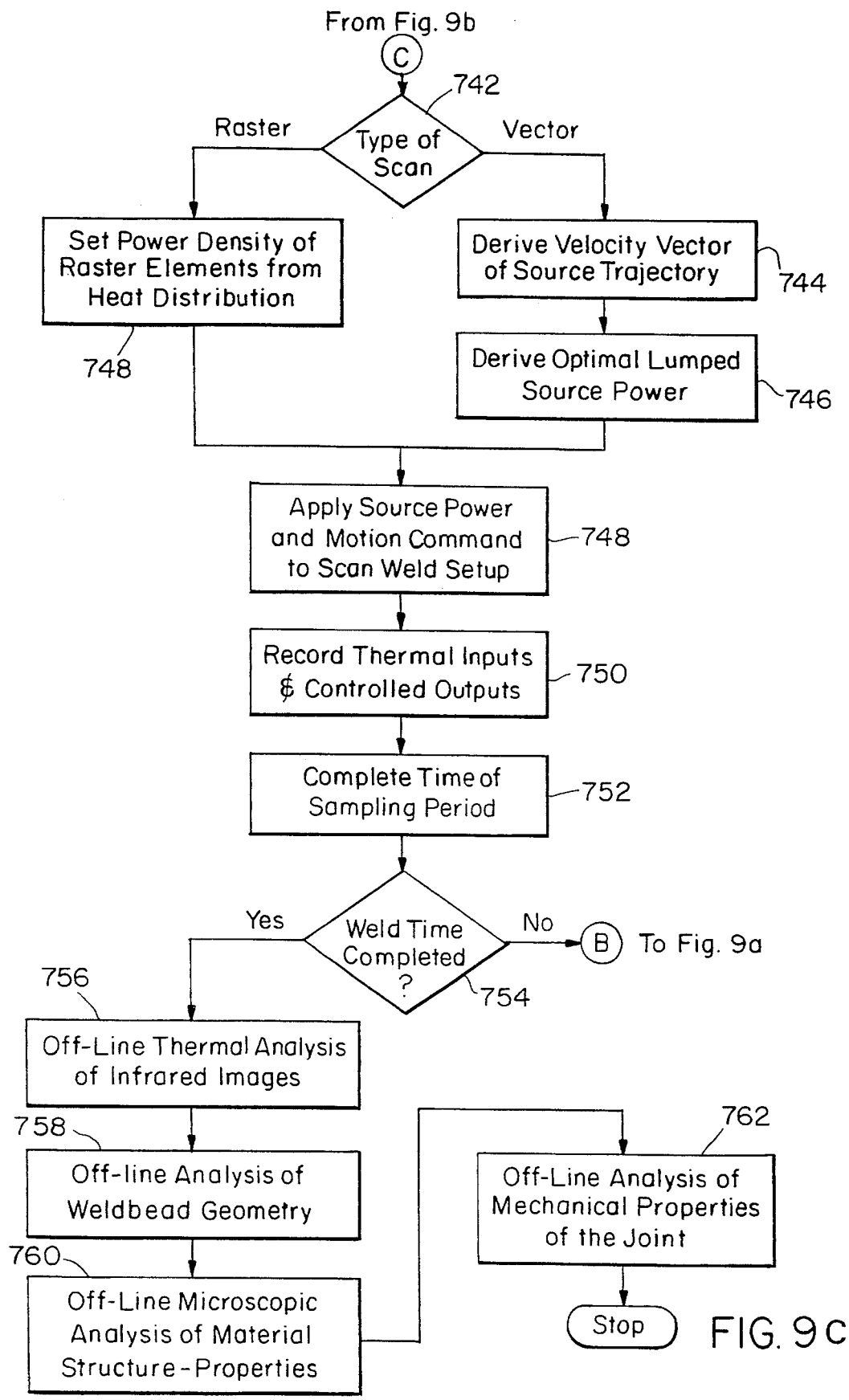

SCAN WELDING METHOD AND APPARATUS

RELATED APPLICATIONS

This is a continuation-in-part application of a prior application Ser. No. 08/275,840 filed on Jul. 15, 1994, entitled "Scan Welding Method and Apparatus," by Charalabos C. Doumanidis, now abandoned.

BACKGROUND OF THE INVENTION

Among thermal joining processes in modern manufacturing technology, autogenous fusion welding has traditionally been ubiquitous within the metal construction industry. Although the roots of this process can be traced back to primitive welding of noble metals and eutectic alloys for the jewelry and armor of prehistoric times, until the development of the oxyfuel torch by Bunsen and electric carbon welding by Bernados in the previous century, fusion welding was not widely accepted on the factory floor. Besides classical methods such as Gas Tungsten Arc Welding (GTAW), new emerging techniques including Plasma Arc (PAW), Laser Beam (LBW) and Electron Beam Welding (EBW) are currently penetrating the production industry. These modern methods, combined with automated mechanized and robotic torch motion systems, enable closer control of the weld bead geometry, the material structure and properties, and the thermal stress or distortion effects of the weld, thus contributing to an enhanced joint quality and productivity of welding operations.

In contemporary industrial practice, the process conditions, such as the torch power and motion, are selected according to empirical recommendations in order to obtain the desired characteristics of the final weld. To handle the welding transients such as the material and torch parameter uncertainty and process disturbances, sophisticated in-process control systems have been proposed which employ measurement and feedback of important lumped weld variables to modulate the torch intensity and speed in real-time. In these systems, the weld features or characteristics result from a single, localized, sequentially moving torch or weld head. Thus, the steep temperature distribution and high cooling rates accompanying a well-penetrated weld. In hardenable high-strength steels, for example, these steep distributions may result in a martensitic structure and residual stresses which render the material practically unweldable by the concentrated heat source from a practical stand point.

Multiple torch schemes with independently modulated heat inputs have been tested to spread out the heat input distribution. Predefined weaving patterns of the torch motion have also been proposed. The multi-torch implementation, however, is rather impractical and costly, and standard mechanized weaving provides only limited additional flexibility in the welding conditions.

SUMMARY OF THE INVENTION

The instant invention concerns an alternative to the classical concentrated-source and sequential welding configuration. Instead, a single heat source is time-shared to implement any specified distributed heat input by scanning along a weld centerline and a region surrounding the centerline while adjusting the torch intensity accordingly on its path. Thus, the advantage of this new scan welding technique over conventional methods lies in the flexibility of thermal boundary conditions on the weld surface. These ensure a continuous, dynamic reshaping of the resulting temperature field, which generates the desired characteristics of high-quality welds.

The invention achieves independent simultaneous control of multiple thermal weld quality features, such as bead geometry, material structure and properties, and residual stress characteristics. Unlike conventional welding methods with sequential motion of a concentrated heat source, in one implementation the scan welding torch reciprocates rapidly on dynamically scheduled trajectories while power to the torch is modulated in real-time to provide a regulated heat input distribution in the weld region and on the weld centerline. The method generates a smooth and uniform temperature field, and deposits the full length of the weld bead simultaneously at a controlled solidification rate. As a result, grain interlacing on the bead interface in conjunction with a regulated material microstructure yield improved tensile joint strength.

In general, according to one aspect, the invention features a welding method that comprises applying energy to a workpiece from a weld head and scanning the weld head repeatedly along a longitudinal length of at least a segment of a weld centerline to generate a weld pool simultaneously along an entire length of the segment.

In specific embodiments, an actual temperature field distribution in the weld region is determined and the scanning of the weld head is modified in response to the actual temperature field distribution.

In other embodiments, an ideal temperature field distribution as a function of welding time is determined which will yield desired weld characteristics. Then, during welding, an actual temperature field distribution in the weld region is determined, the ideal temperature field distribution and the actual temperature field distribution are compared, and the scanning of the weld head modified to minimize the differences between the actual temperature field distribution and the ideal temperature field distribution. More specifically, determining the actual temperature field distribution in the weld region comprises detecting electromagnetic radiation emitted by the weld region. Also, an emissivity of a surface of the workpiece can be mapped prior to the scanning of the weld head and the detected temperature field distribution corrected in response to the mapping.

In still other embodiments, the actual temperature field distribution is determined by computer simulation.

In general, according to another aspect, the invention features a welding method that comprises determining an ideal temperature field distribution which will yield a weld having desired characteristics along a weld centerline. Then during the welding process, a weld head is scanned over a weld region surrounding at least a segment of the weld centerline and an actual temperature field distribution determined in the weld region. The ideal temperature field distribution and the actual temperature field distribution are then compared and the weld head scanned to minimize differences between the actual temperature field distribution and the ideal temperature field distribution.

In specific embodiments, the power to the weld head is modulated in response to the differences between the actual temperature field distribution and the ideal temperature field distribution during the scanning.

In other embodiments, power to the weld head is modulated in response to the differences between the actual temperature field distribution and the ideal temperature field distribution while raster scanning the weld head across the weld region.

In general, according to still another aspect, the invention features a welding method that comprises applying energy to a workpiece from a weld head and scanning the weld head over a weld region surrounding a weld centerline to generate a weld pool simultaneously along an entire length of the weld centerline.

In general, according to a different another aspect, the invention features a welding apparatus that comprises a weld head for heating a workpiece, a scanning device for translating the weld head relative to the workpiece, and a controller for controlling the scanning device to heat the workpiece in a weld region surrounding at least a segment of a weld centerline to form a weld pool simultaneously along an entire length of the segment of the weld centerline by repeatedly scanning the weld head parallel to the centerline.

In specific embodiments, an infrared detector is used to determine a temperature field distribution in the weld region. Then, more specifically, a controller modifies a pattern of the scanning of the weld head in response to the temperature field distribution.

In other embodiments, the controller stores an ideal temperature field distribution as a function of welding time that will yield desired weld characteristics. Then more specifically, an infrared detector determines an actual temperature field distribution in the weld region. The controller determines an actual temperature field distribution in the weld region, compares the ideal temperature field distribution and the actual temperature field distribution and scans the weld head to minimize the differences between the actual temperature field distribution and the ideal temperature field distribution.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

BRIEF DESCRIPTION OF THE DRAWINGS

In the accompanying drawings like reference characters refer to the same parts throughout the different views. The drawings are not necessarily to scale, emphasis instead being placed upon illustrating the principles of the invention. Of the drawings:

FIG. 7a and 7b show the weld pool formation in traditional welding and scan welding, respectively;

FIGS. 9a, 9b, and 9c illustrate a method for scan welding according to the invention;

DETAILED DESCRIPTION OF THE DRAWINGS

Figure 1:
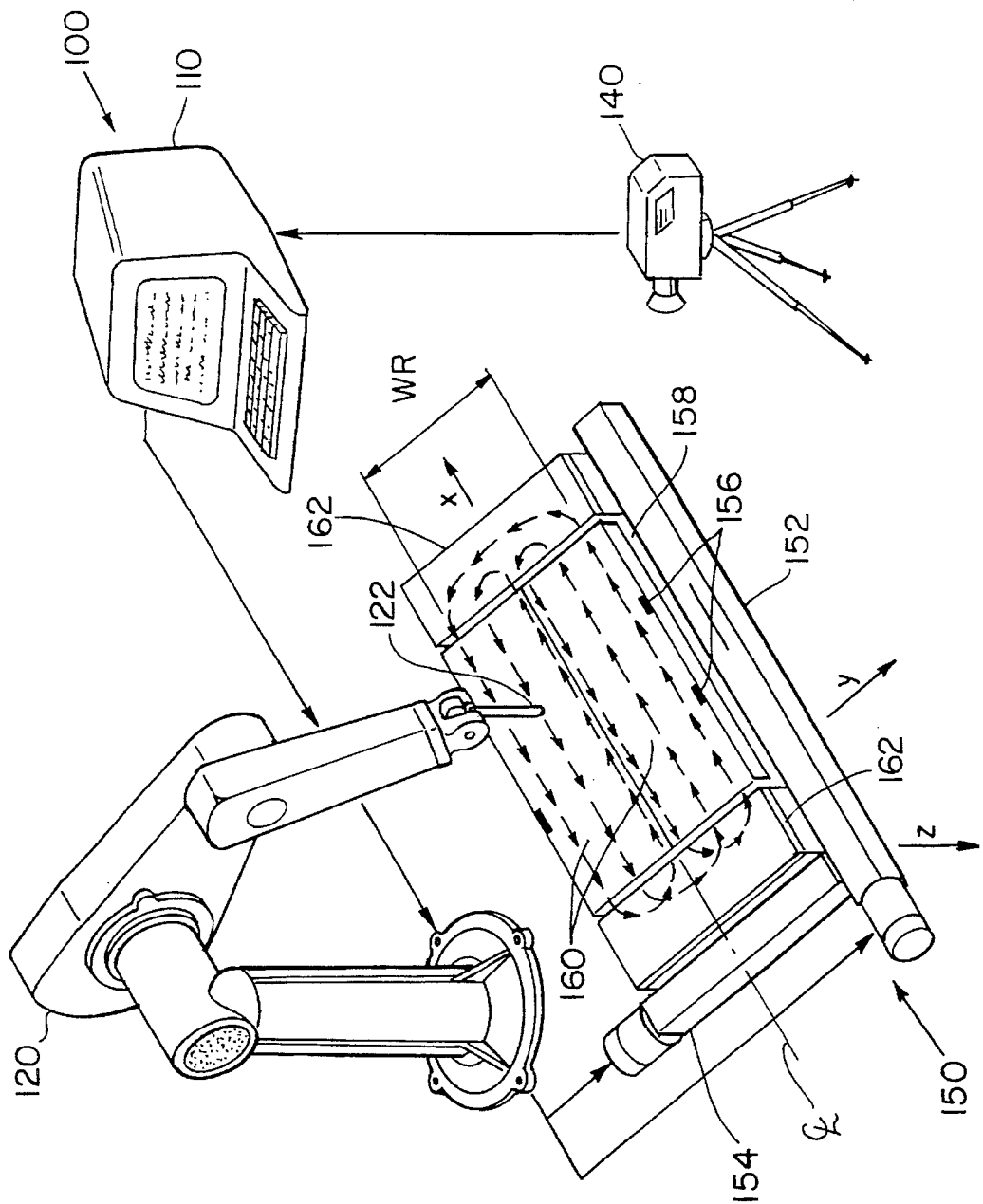
FIG. 1 is a schematic perspective view of a first embodiment of the inventive scan welding apparatus.

Turning now to the figures, a scan welding apparatus 100 constructed according to the principles of the present invention is schematically illustrated in FIG. 1. Specifically, a controller 110, such as a computer, controls a robot 120 and an X–Y table 150. The robot 120 carries a torch or weld head 122 for welding a weld part or work piece consisting of metal plates 160. The weld head 122 is scanned across the metal plates by the coordinated movement of the robot 120 and X–Y table 150 as dictated by the controller 110 while the controller simultaneously modulates the power to the weld head.

Generally, the weld head 122 can be any non-consumable type electrode. Two examples are a gas tungsten arc welding (GTAW) head or a plasma arc welding (PAW) head. A gas metal arc welding (GMAW) head could be used, however, if separate material addition using a filler rod were possible. In still other implementations, the robot 120 and weld head 122 could be replaced with a laser beam (LBW) or electron beam welder (FBW). In these alternative welding devices, scanning is accomplished by deflecting the laser or electron beams, which serve as the weld head or torch, rather than physically scanning an electrode over the surface of the metal plates 160.

The X–Y table 150 is capable of translating the plates 160 along the X and Y axes to facilitate the scanning of the welding head 122 across the plates 160. The X–Y table 150 comprises an X actuator stage 152 and Y actuator stage 154 which are both controlled by the controller 110. The metal plates 160 are restricted from lateral movement by fixtures 156 that clamp the metal plates 160 onto the table base 158. The metal plates 160 are secured from longitudinal movement by end dummy plates 162. In other implementations, the weld head 122 would be entirely stationary and all of the scanning accomplished by the movement of the plates by the table 150. In a different implementation, the metal plates 160 would be stationary and the weld head 122 scanned by the robot 120 to achieve the entire movement of the metal plates 160 relative to the weld head 122.

A stationary infrared pyrometry camera 140 is directed at the plates 160 to detect infrared electromagnetic radiation generated as the metal plates 160 are heated by the welding head 122. This camera 140 enables non-contact temperature measurements on the external weld surface. Although not specifically shown, the infrared camera comprises a mechanical galvanometer scanner and a liquid nitrogen-cooled HgCdTe detector sensitive at wavelengths in the range of 8 to 12 μm, which is appropriate for temperatures achieved in stainless steel welding.

The scan welding apparatus 100 can modulate a two-dimensional heat input distribution q(X,Y,0;τ) across a surface of the weld part over time to create a time dependant temperature field distribution T(x,y,z;t) throughout the weld region WR which will satisfy necessary conditions for optimal weld formation. A time dependant desired temperature field distribution $T_d(x,y,z;t)$ is defined as a temperature distribution throughout the weld region WR that will yield the optimal weld formation.

The desired temperature field distribution $T_d(x,y,z;t)$ is dictated by the required weld bead geometry, material structure and properties, and the thermal stress/strain specifications. As discussed in detail infra, the desired field distribution can be designated through an off-line numerical simulation model or can be measured directly by an infrared thermometry camera on a joint surface during an off-line reference welding test run in the laboratory, which is then reproduced during a real-time operation by controller 110. The desired temperature field distribution in most applications will be the distribution that yields the simultaneous weld bead formation along the entire length of the weld centerline in gradual cross-sectional increments.

The feasibility of scanning the entire weld centerline to achieve the simultaneous formation of the weld bead depends upon its length and attributes. As a result, scanning the weld centerline in overlapping segments will generally be required with complex or long welds. An approximation for the minimum length of the segments can be defined in relation to the weld pool formed in a tradition welding process. Generally, the length of the scan weld segment along the weld centerline is greater than a steady state width of a weld pool generated by a stationary torch at an equivalent power.

Figure 6A:
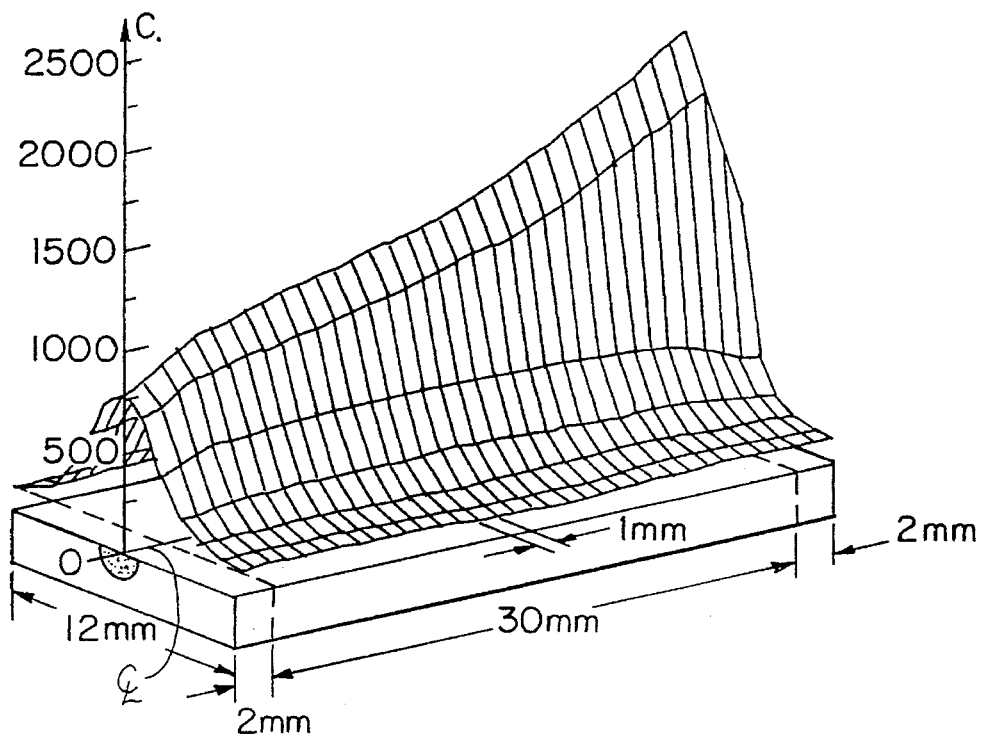
FIGS. 6a and 6b illustrate computer simulated top surface temperature hills for traditional and scan GTA welding, respectively.
Figure 6B:
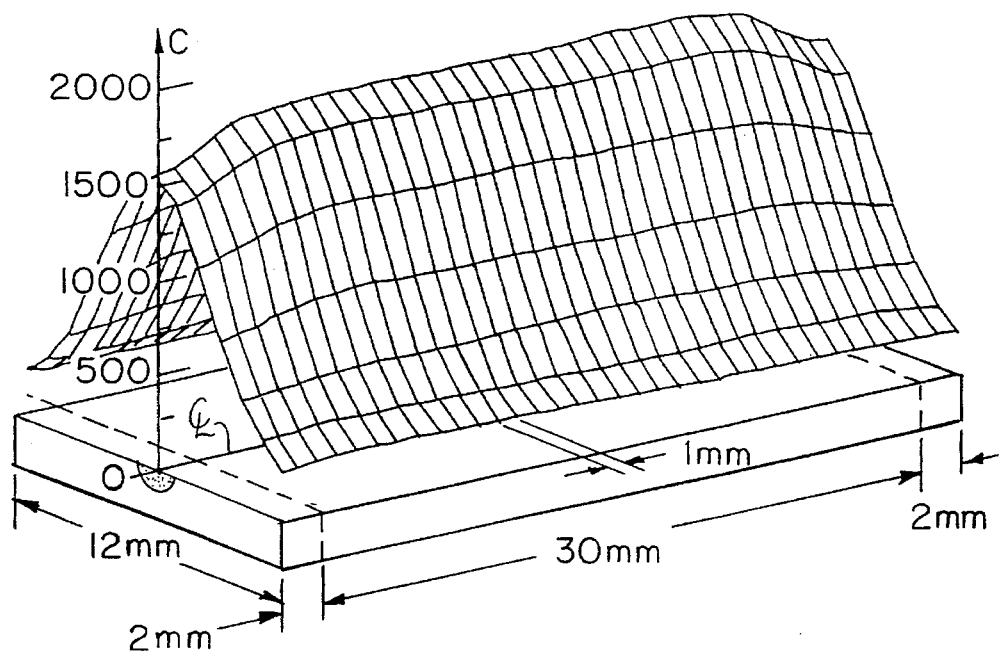

FIGS. 6a and 6b illustrate computer simulated top surface temperature hills for traditional and scan GTA welding, respectively, for a 30×12 mm weld part and 2 mm dummy plates. As illustrated by the contrast between FIGS. 6a and b, the traditional welding, FIG. 6a, produces a peaked hill, since the bead is incrementally formed along the centerline CL, with steep gradients moving laterally away from the weld centerline CL. The scan welding, however, produces an essentially uniform temperature distribution along the entire centerline with a gradual temperature roll-off moving laterally away form the centerline CL, FIG. 6b. As a result, scan welding avoids the steep temperature gradients, which degrade the weld quality, and ensures uniformity in the weld's characteristics along entire centerline since the bead is simultaneously formed under essentially the conditions. FIGS. 7a and 7b show the same simulated steady-state weld pool interface (i.e., the solidus isotherm) for both traditional welding FIG. 7b, and scan welding, FIG. 7a. The almost uniform cross-section of the elongated scan weld pool in FIG. 7b can be contrasted against the ellipsoidal shape of the melt puddle in traditional welding FIG. 7a.

Figure 6C:
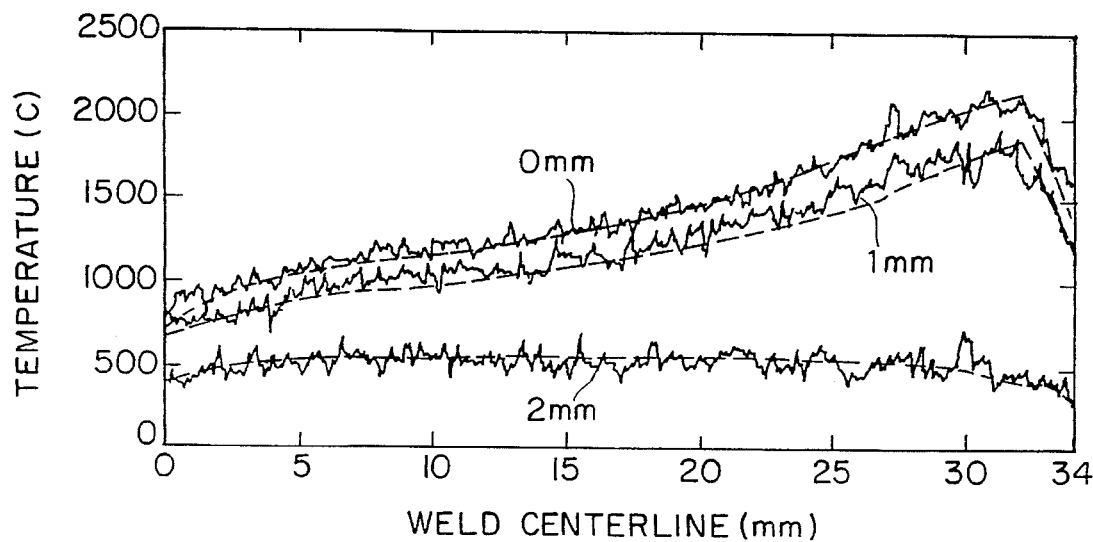
FIGS. 6c and 6d illustrate computer simulated (dashed lines) and actual experimental (solid lines) surface temperature profiles parallel to the weld centerline and transverse to the centerline, respectively, for traditional GTA welding.
Figure 6D:
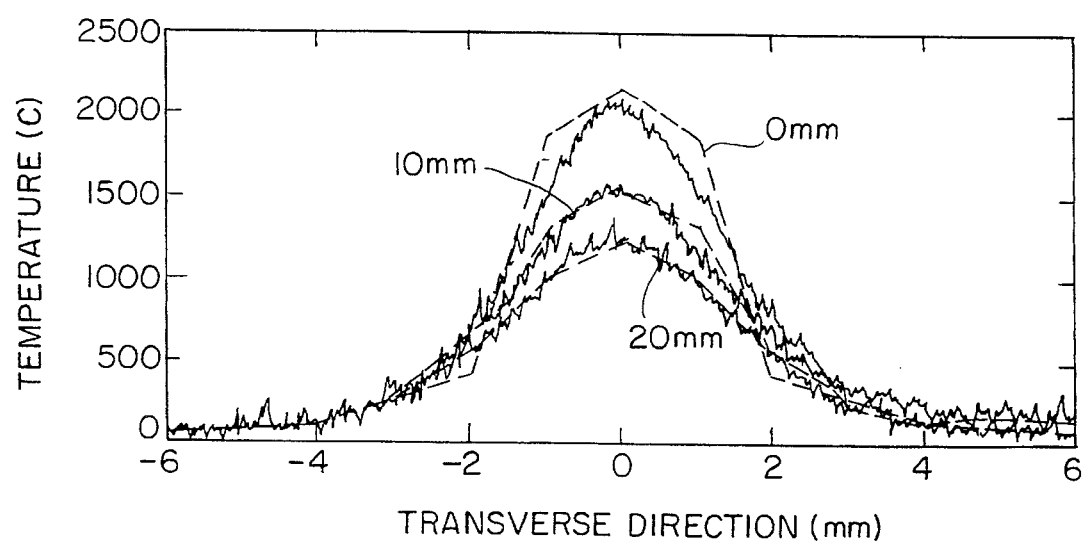
Figure 6E:
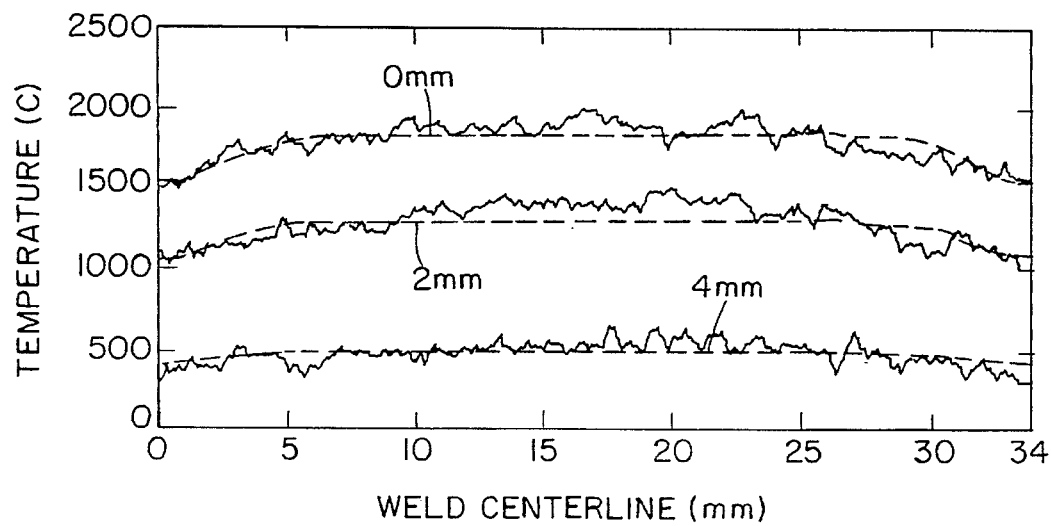
FIGS. 6e and 6f illustrate computer simulated (dashed lines) and actual experimental (solid lines) surface temperature profiles parallel to the weld centerline and transverse to the centerline, respectively, for the inventive scan GTA welding.
Figure 6F:
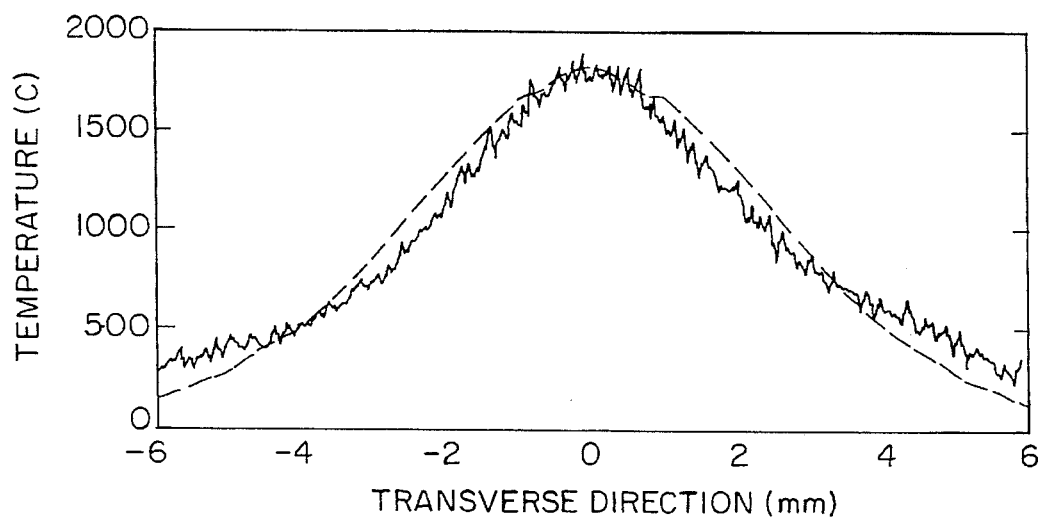

FIGS. 6c through 6f better illustrate the differences between the acclivities of the thermal hills. Here, FIGS. 6c and 6e show the temperature profiles on longitudinal sections of the temperature hills at various distances from the weld centerline for traditional welding and scan welding, respectively. Scan welding produces an almost invariant thermal profile in the centerline direction. FIGS. 6d and 6f show the temperature profile on cross sections transverse to the weld centerline for traditional and scan welding, respectively. In the transverse direction scan welding, FIG. 6f, produces smooth temperature gradients across the weld bead in contrast with the steep longitudinal gradients and high cooling rates of traditional welding, FIG. 6d. FIG. 6c through 6f also demonstrate the general agreement between actual experimental measurements, the solid lines, and the numerical simulations, broken lines, discussed in detail infra.

The scan welding apparatus 100 can provide a desired heat input distribution in a weld region WR by a number of types of scanning. A few basic qualities, however, apply to each of these different scanning types. First, throughout the scan welding process, the weld head 122 is repeatedly scanned along or parallel to the weld centerline, or segment thereof, to achieve simultaneous weld bead formation. Secondly, the weld head is scanned, above the weld pool but also over the portions of the weld part bordering the weld pool to achieve more gradual temperature gradient in the regions of the weld part surrounding the pool.

For the simplest case of a linear weld centerline CL as illustrated in FIG. 1, the rapid and repetitive sweeping and modulation of the single weld head 122 along the centerline CL and sideline paths at variable offsets from the centerline, see phantom lines on the metal plates 160 in FIG. 1, will enable simultaneous weld bead formation. For more complex welds, a dynamically scheduled trajectory in a vectored motion is implemented similar to the beam tracing on an oscilloscope screen for non-linear welds. In this technique more completely described in relation to FIG. 8, the torch or weld head 122 scanned over the portions of the weld region WR in which the greatest deviation between the desired and actual temperature is present during the scan welding process.

Figure 5:
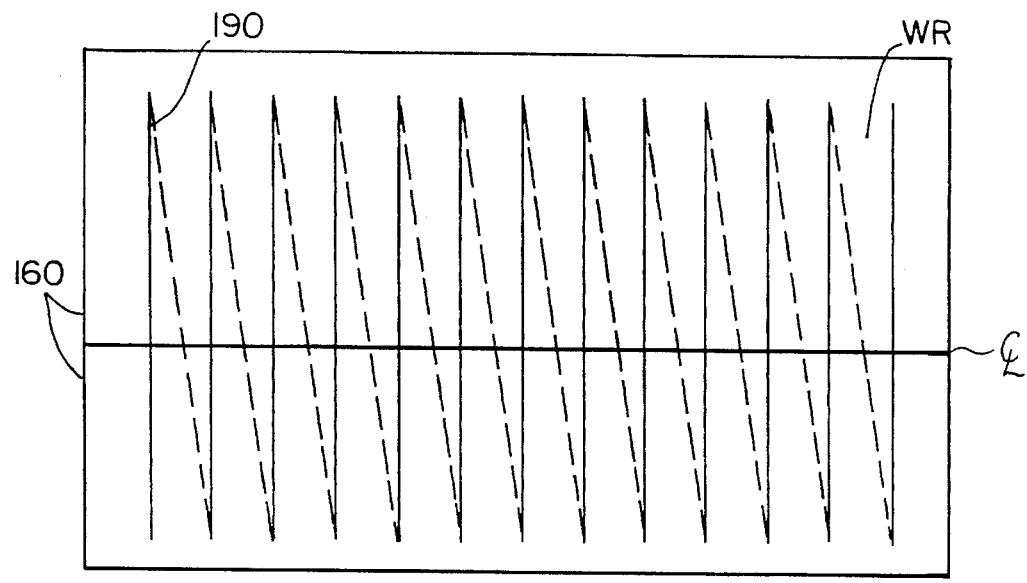
FIG. 5 shows a raster scanning pattern of a laser or electron beam across a weld centerline according to the invention.

In LBW or EBW, high-bandwidth power manipulation and fast spatial deflection of the weld beam can be accomplished enabling scan welding of more complex weld centerlines. The limitations of slower more conventional arc welding methods such as GTAW or PAW in which the weld head 122 is servodriven mechanically through the coordinated motion of the robot 120 and the servodriven X–Y table stages 152–154 are no longer applicable. Therefore, an orthogonal raster pattern, such as that used in cathode ray tubes, is the preferred scanning method since it can accommodate more complex heat input distributions. FIG. 5 illustrates a raster scan 190 of laser or electron beam across a weld centerline CL to cover the weld region WR. If the analogy to the cathode ray tube is continued, the image that would appear on the tube, which is be analogous to the temperature field generated by the scan welding process, would be bright line at the position of the weld centerline. This bright line would then slowly and gradually fade to black as the distance from the centerline increased.

Figure 2:
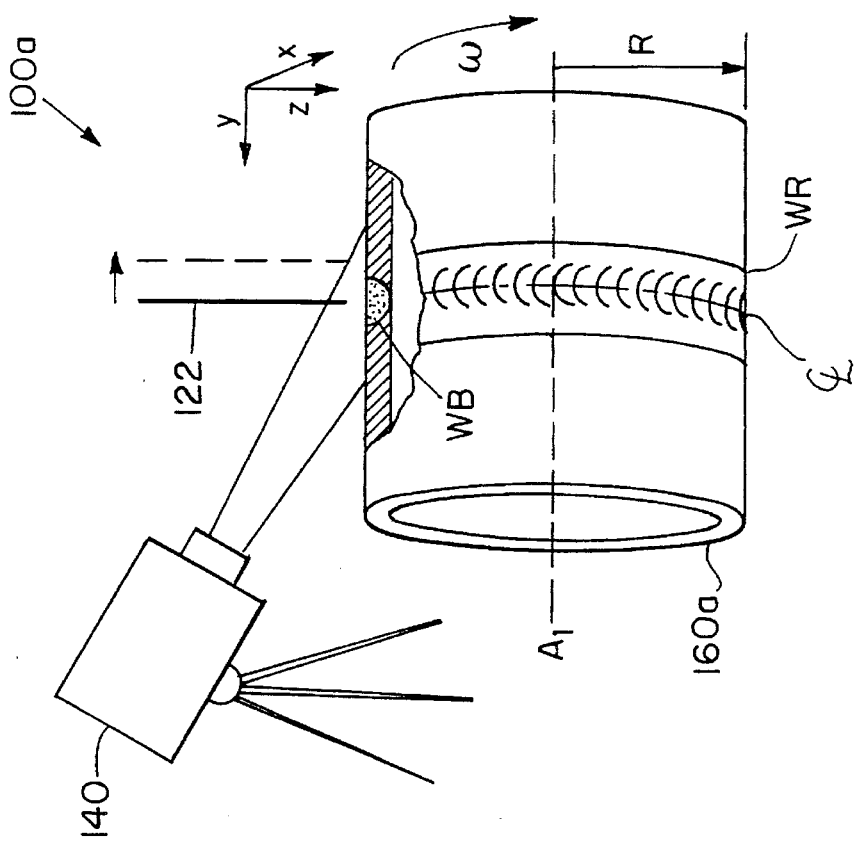
FIG. 2 is a perspective view, with partial cut-away, of a second embodiment of the inventive scan welding apparatus.

FIG. 2 illustrates a second embodiment of the scan welding apparatus 100a which is suitable for forming a weld bead WB around tube-shaped weld parts 160a. Here, a weld head 122 is limited to y-axis axial movement over a weld region WR surrounding the centerline CL. Scanning over the entire centerline is achieved by the coordinated rotation of the weld part 160a around axis $A_1$.

Figure 3:
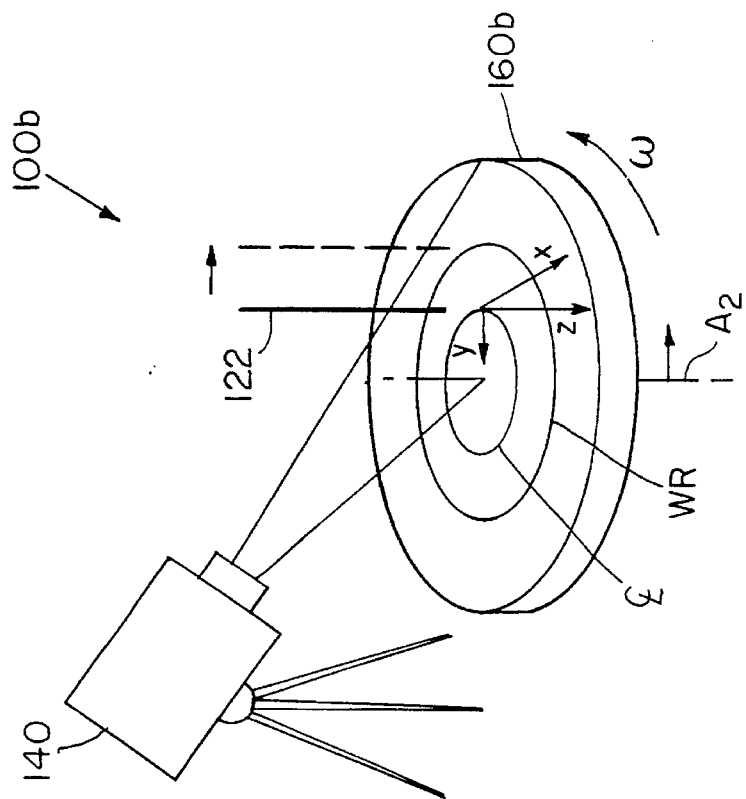
FIG. 3 is a perspective view of a third embodiment of the inventive scan welding apparatus.

The scan welding apparatus 100b of FIG. 3 is a third embodiment suitable for welding disk-shaped metal pieces. Here, a weld head 122 is scanned along the Y-axis radially across the disk-shaped weld part 160b. Coverage of the entire weld centerline CL is achieved by the rotation of the weld part 160b around axis $A_2$ at angular velocity ω.

Figure 4:
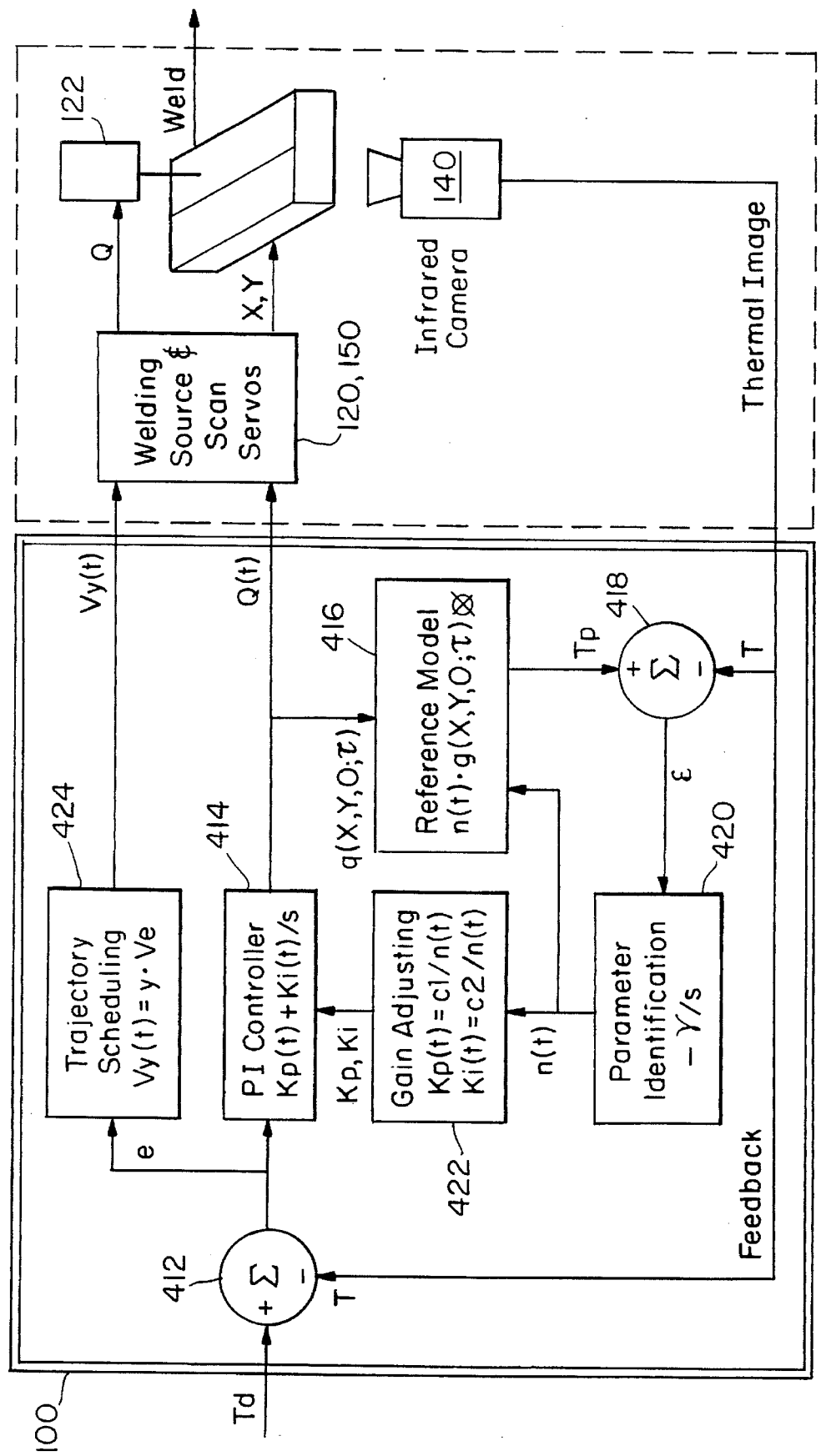
FIG. 4 is a schematic block diagram of an inventive distributed-parameter controller for the welding apparatus of FIGS. 1 through 3.

Turning now to FIG. 4, the distributed-parameter controller 110 is illustrated for managing the welding apparatus illustrated in FIGS. 1 through 3. Basically, in the context of a weld part in 3-dimensional space defined by orthogonal axes x,y,z, this controller 100 modulates the time dependant two-dimensional heat input distribution $q(X,Y,0;\tau)$ across a surface of the weld part so that the resulting time dependant temperature field or distribution $T(x,y,z;t)$ within the weld part follows a desired time dependant temperature distribution $T_d(x,y,z;t)$.

Although the controller 110 is illustrated in the context of discrete blocks within an overall structure, its most likely implementation is as a software algorithm executed by a computer. Ideally, the controller software would be interfaced directly to a computer-aided design (CAD) package used for the welded parts by sharing the same geometric modelling description of objects and motions and thus, serve as a thermal computer-aided manufacturing (CAM) postprocessor for scan welding. The combination of product and process design procedures in an integrated environment will contribute to the optimization of the scan welding performance in industrial applications.

The controller 100 modulates the power to the weld head 122 according to the local thermal error e, i.e., the deviation of the measured temperature T from the specified desired temperature $T_d$, block 412. The local thermal error is utilized by a two-dimensional proportional-intregal (PI) controller, block 414, which is described in *Linear Systems*, by Kailath, T., 1980, Prentice-Hall, Englewood Cliffs, N.J. and incorporated herein by this reference. The PI controller is defined by:

$$Q(t) = K_p(t) \cdot e(X,Y,0;t) + K_i(t) \int_0^t e(X,Y,0;\tau)d\tau$$

is the temperature error at the current torch position and Q the torch power. $K_p$ and $K_i$ are the proportional and the integral gains, respectively, and are determined according to the thermal control or performance specifications and dynamic welding process parameters, such as the arc efficiency n. These process parameters are variable in space and time during the operation because of heat transfer nonlinearities, thermal drift of the arc and material properties, and disturbances of the torch characteristics and the weld geometry configuration. Thus, to ensure the maximal closed-loop performance, these parameters must be a function of real-time temperature measurements and the gains $K_p$ and $K_i$ must be adjusted in-process by an adaptation law.

The adaptive control scheme employs a real-time Green's thermal formulation as an in-process reference model. This model, block 416, assumes a concentrated heat input acting on a plate of ideal geometry. The plate is assumed to have temperature-invariant material properties and no phase transformations. The heat flow is conductive with convective losses at the surfaces. The Green's function $G(x,y,z;t:X,Y,0;\tau)$, i.e., the temperature developed at point $(x,y,z)$ at time t because of a unit heat input from a torch at point $(X,Y,0)$ at time $\tau$, is given as a series of thermal images:

$$g(x,y,z;t:X,Y,\tau) = \sum_{k=-\infty}^{\infty} \frac{1}{8\rho c\,[\pi\alpha(t-\tau)]^{3/2}} \exp\left[-\frac{(x-X)^2+(y-Y)^2+(z-2kD)^2}{4\alpha(t-\tau)} - \frac{2h(t-\tau)}{\rho cD}\right]$$

where $\alpha$, $\rho$, and c are the thermal diffusivity, density, and heat capacity of the material. D is the plate thickness and h an equivalent convection factor. Because of conduction linearity, the heat input distribution, $q(X,Y,0;\tau)$ supplied by the torch at an efficiency of $n(\tau)$ on the weld surface generates a predicted temperature field $T_p(x,y,z;t)$ by superposition:

$$T_p(x,y,z;t) = T_p(x,y,z;0) + \int_0^t \oint_{(X,Y)} n(\tau) \cdot$$

$$g(x,y,z;t:X,Y,0;\tau) \cdot q(X,Y,0;\tau)dXdY \cdot d\tau$$

Initial estimates of the Green's field model $g(X,Y,0;\tau)$ of block 416 are updated in-process by deconvolving the heat input distribution $q(X,Y,0;\tau)$ supplied by the torch and in response to differences between actual T and predicted $T_p$ temperature measurements at the location.

The reference model 416 is then utilized to identify the time varying arc efficiency n(t) in block 418 and 420 according to the MIT rule for parameter adaption, Astrom J., and Wittenmark B, 1989, "Adaptive Control", Addison-Wesley, Reading Mass., which is incorporated herein by this reference. By application of this rule:

$$n(t) = n(0) - \gamma \int_0^t \epsilon(X,Y,0,\tau)d\tau$$

is defined as the difference between the temperature at the current source location as predicted by the reference model $T_p$ and the respective measured temperature T. $\gamma$ is the adaptation gain. PI controller 414 gains are then adjusted in block 422 as $K_p(t)=c_1/n(t)$ and $K_i(t)=c_2/n(t)$. The constant $c_1$ and $c_2$ depend on the specified damping and speed of the closed-loop system dynamics.

The torch motion trajectories in vectored scan welding are also scheduled in-process in block 424 by the control system 100. The control system attempts to guide the torch so as to track the locus of the moving maximum of the dynamic temperature error surface e. For constant-speed scanning in the bead direction, the transverse offset velocity is modulated according to a real time, steepest-assent error optimization algorithm:

$$v_y(t) = v_x \cdot [\hat{y} \cdot \nabla e(X,Y,0;t)]/[\hat{x} \cdot \nabla e(X,Y,0;t)]$$

where $v_x$ is the constant scanning speed along the centerline and $\hat{x},\hat{y}$ are the unit vectors in the longitudinal and transverse directions, respectively.

Figure 8:
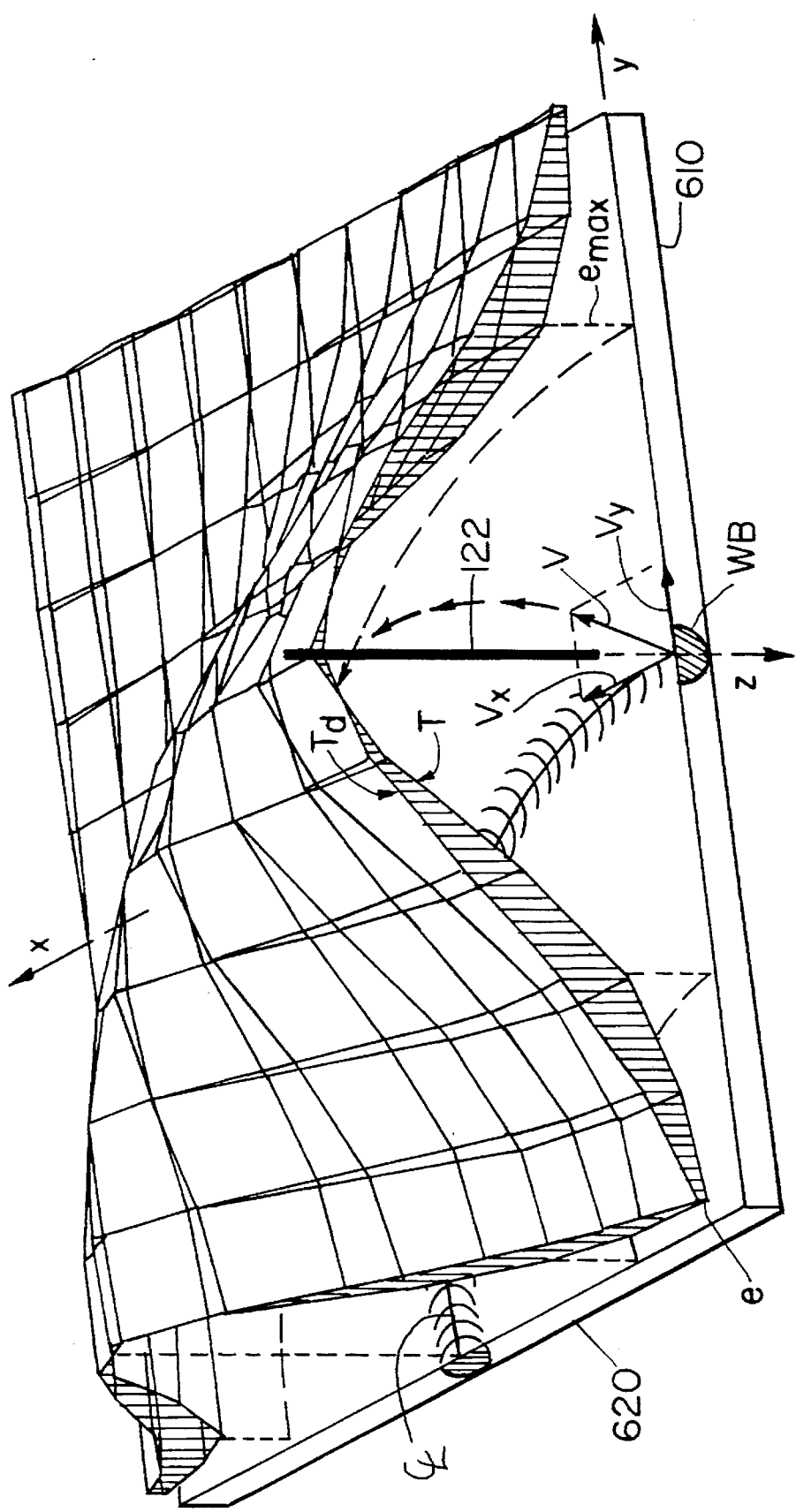
FIG. 8 shows torch vectoring to regions of maximum disparity between desired and measured temperatures according to the invention.

FIG. 8 illustrates an example of a circumferential scan welding of a rectangular flange 610 around the perimeter of a circular disk 620. The flange/disk are rotated at a constant velocity $v_x$. As a result, the composite velocity of torch 122, consisting of the constant part rotation $v_x\hat{x}$ and the modulated radial torch offset $v_y(t)\hat{y}$, aligns with the gradient of the error distribution e between the desired temperature hill $T_d$ and the measured field T on the plate surface. Thus, the torch 122 is driven by this in-process trajectory planning strategy to the sidelines of the maximum error $e_{max}$, i.e., the weld regions where its heat input is needed most.

Figure 10:
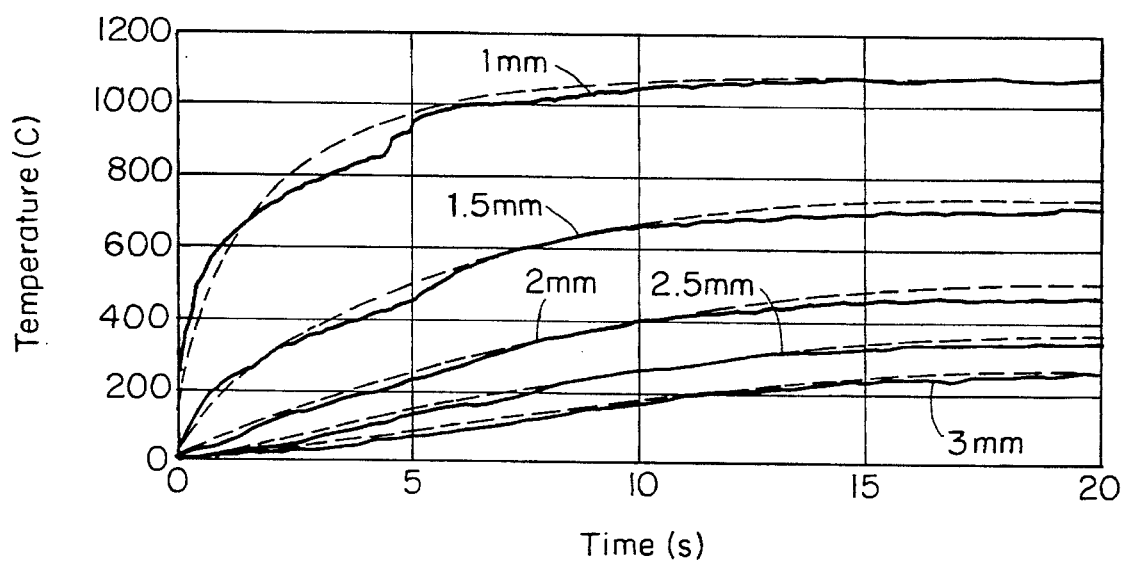
FIG. 10 illustrates time-dependant desired temperature field for a discrete location on the weld part.
Figure 9A:
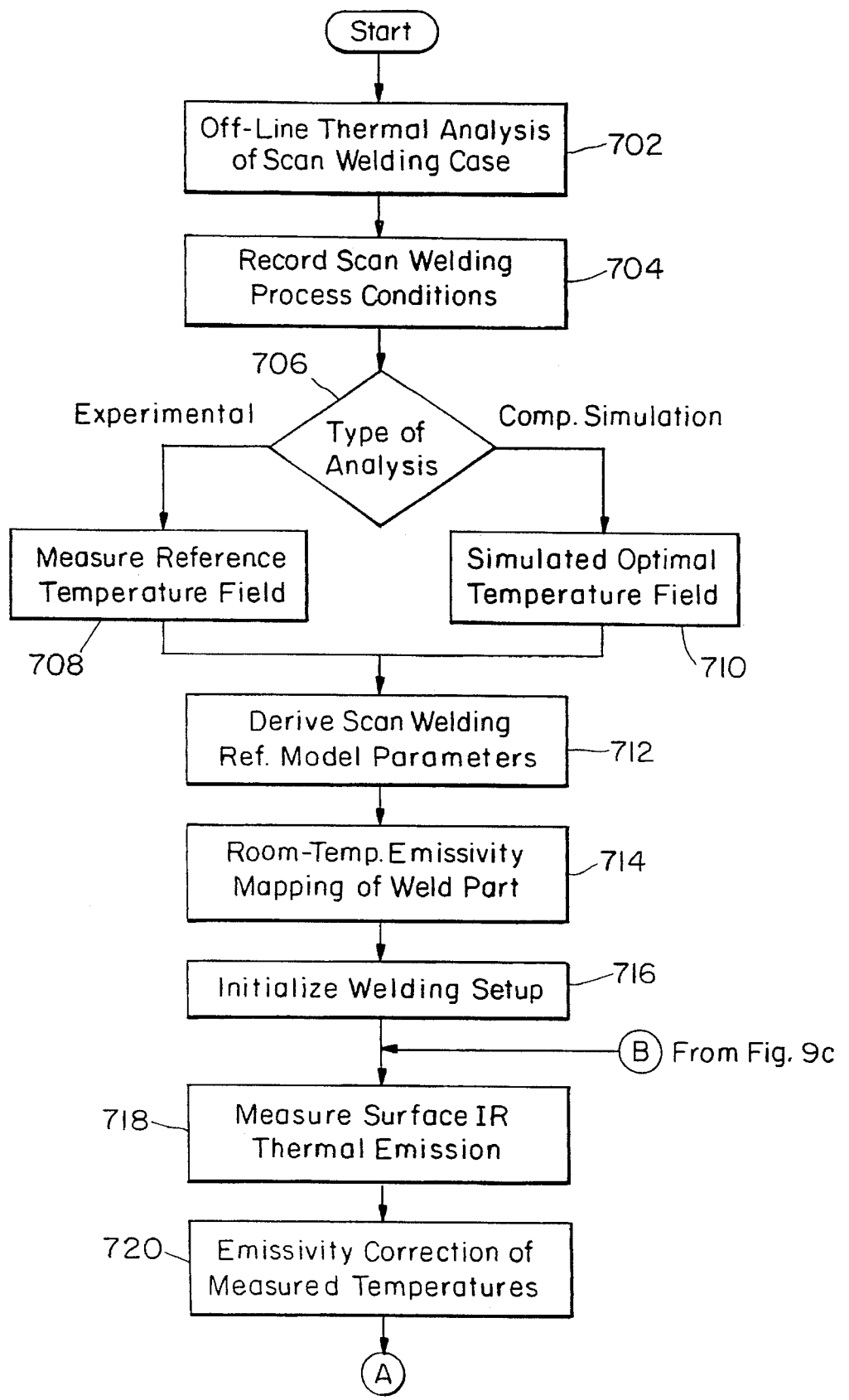
Figure 9B:
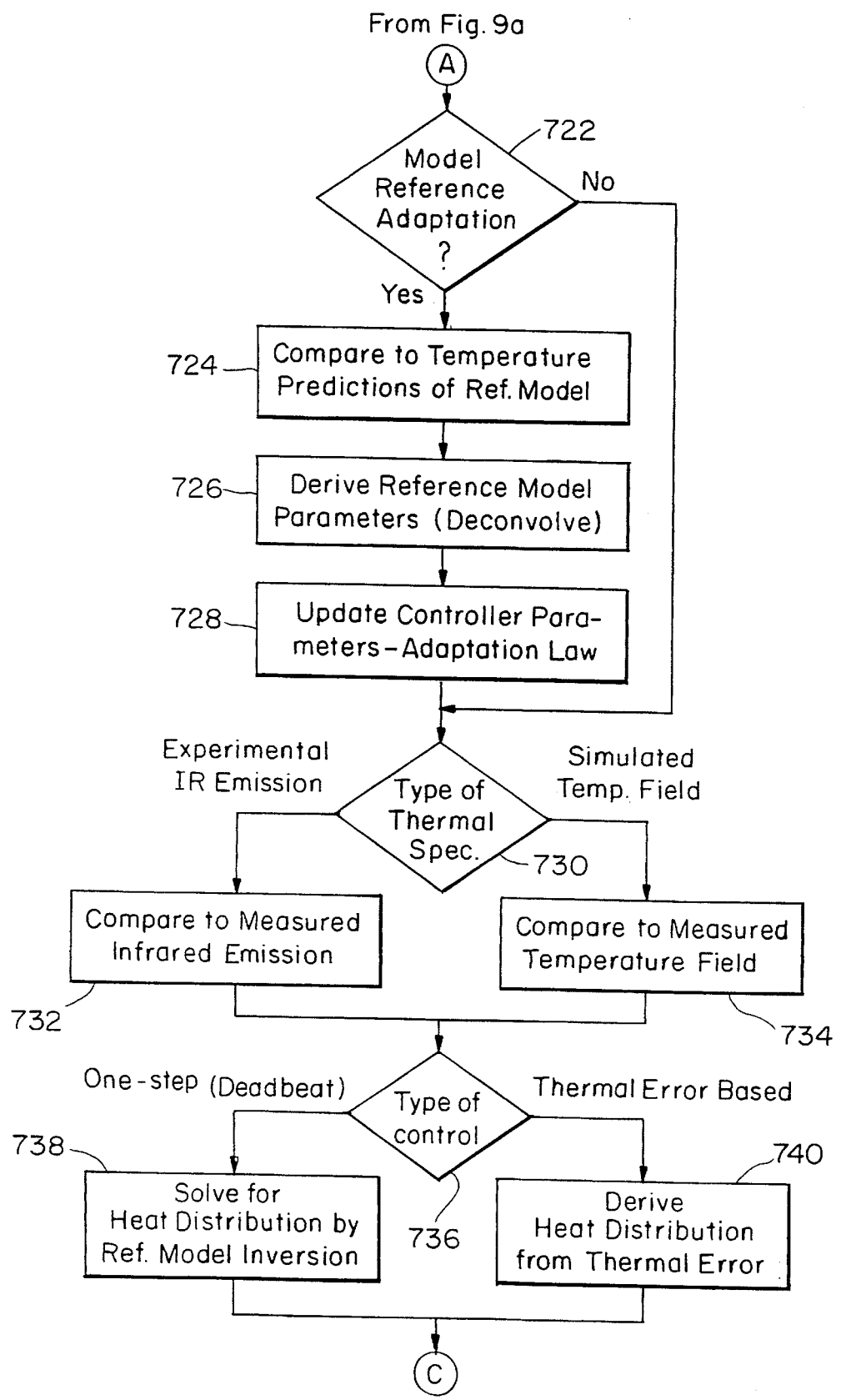

The control of the relative movement of weld head or torch 122 relative to the weld part can also be described in the context of the method illustrated in FIGS. 9a, 9b, and 9c. Here, in steps 702 and 704, the time dependent temperature field $T_d$ which will yield a weld of required specifications are defined. More specifically, in step 702, an off-line thermal analysis of the scan welding case is performed to identify and quantify the characteristics of the desired weld. Then, in step 704, the time dependent temperature field $T_d$ in the weld region are defined which will ultimately yield a weld of these desired characteristics. For example, in FIG. 10, a time dependent temperature field for a weld of arbitrary characteristics is shown for 1–3 mm from the weld centerline.

The desired time dependent temperature field $T_d$ (x,y,z;t) is defined by either an experimental test-run or a computer simulation of the actual welding steps to be performed. If the experimental test-run step 708 is selected in step 706, the infrared thermal emission are measured and recorded throughout the welding process.

Figure 11:
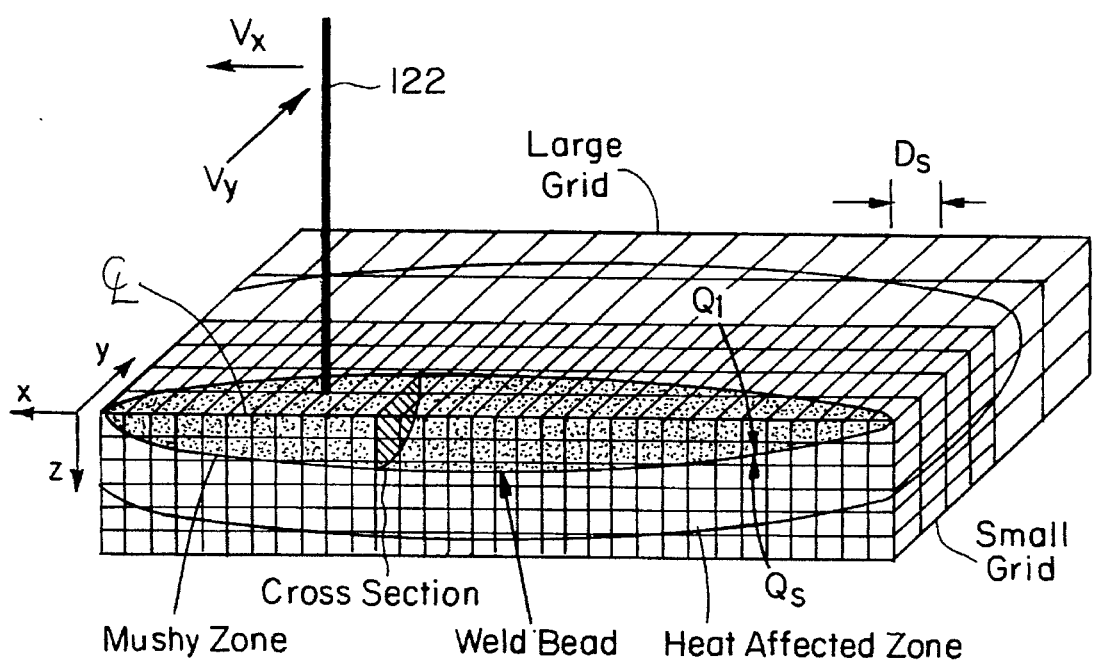
FIG. 11 illustrates a finite-difference simulation of scan welding.

Alternatively, if the simulation is selected in step 710, a numerical, finite-difference (FDM) simulation of scan welding is performed in step 708. This process model is disclosed in "Distributed-Parameter Simulation of the Scan Welding Process", by Marquis B, and Doumandis C, 1993, IASTED *Intl. Conf. on Modelling and Simulation,* Pittsburgh, Pa., pp. 146–149, which is incorporated herein by this reference. This computational simulation integrates the transient conduction (Fourier) equation in discrete time steps Dt and space elements Ds, using an explicit Eulerian formation:

$$T(x,y,z;t+Dt) = T(x,y,z;t) + \frac{\alpha \cdot Dt}{Ds^2} \left[ \sum_{i=1}^{6} T_i(x \pm Ds, y \pm Ds, z \pm Ds; t) - 6T(x,y,z;t) \right]$$

where T is the temperature of a grid location at time t and $T_i$ the temperatures of its neighbor grid nodes at distance Ds in the three dimensions. This model employs three 3-D grids of progressively coarser element size for the weld pool, the heat affected zone (HAZ) and the surrounding region as shown in FIG. 11. The model provides for multitorch and arbitrary continuous surface heat distributions, as well as temperature-dependent material properties and transformations, flexible initial preheat distributions, boundary losses by various heat transfer modes, and convection effects in the weld pool through equivalent directional conduction coefficients. The unknown model parameters, such as the torch efficiency n, are calibrated so that the predicted weld nugget cross section matches the experimental measurements. The simulation output includes maps of the 3-D thermal and phase field, as well as 2-D temperature hill and isotherm surfaces. This computer simulation is also used to develop the initial model parameters of block 416 in FIG. 4 since it yields an accurate model. Generally, this simulation is too slow to run in real-time thus making it inappropriate to update the model parameters in-process.

From either the computer simulation of step 710 or the experimental test-run of step 708, the initial parameters for a scan welding reference model are established in step 712. Subsequently in step 714, the room-temperature emissivity of the particular weld part is mapped to detect any random variations. For example, in the manufacturing environment, surface sections of the weld parts may be randomly oxidized. The higher emissivity of these oxidized sections can therefore be detected due to the uniform temperature of the weld part and compensated later in-process.

In step 716, the welding set apparatus is initialized by bringing the welding head 122 on-line and ensuring the integrity of the connections between the controller 110, infrared pyrometry camera 140, X–Y table 150, and robot 120.

In step 718, the surface infrared emission are detected and corrected in step 720 using the room temperature emissivity mapping of step 714. Then, if an adaptive model is used, step 722, new reference parameters are generated. Adaptation of the model's reference parameters involves comparison of the temperature predictions $T_p$ of the reference model with the detected temperatures T, step 724. From this comparison, the resulting data is used to deconvolve and derive new reference model parameters in steps 726 and 728 according to the MIT adaptation law.

In step 730 the program control branches in dependence upon whether the original analysis was the computer simulation of the temperature field or the experimental test run in which the infrared radiation emission were recorded. If the original analysis was the test run, then the desired infrared radiation emission of the test run can be directly compared with the detected infrared radiation levels in step 732. In contrast, if the original analysis had been the computer simulation, then the desired surface temperature field distribution as determined in the computer simulation is compared with the surface temperature field distribution as derived from the current infrared radiation emission from the weld part in step 734.

Using the desired temperature and the detected actual temperature, one of two possible types of control are available step 736. The one-step or deadbeat control is used step 738, the input heat distribution is solved by inversion of the reference model. This process is described in more detail in "Discrete-Time Multi-Variable Adaptive Control," by Goodwin, G. C., Ramadge P. J. and Caines, P. E., *IEEE Transactions on Automatic Control,* Vol. AC-25 No. 3, June 1980, pg. 449–56, which is incorporated herein by this reference. If control is based upon the thermal error step 740 as described in connection with FIG. 4, then the input heat distribution q(t) is derived from the thermal error which is produced by differencing the desired temperature $T_d$ and the actual temperature T.

In step 742, depending on the type of scan, the torch is driven in either a raster pattern or a vector pattern to apply the heat input distribution to the weld part. For example, if a raster scanning pattern is selected or possible with the particular type of weld head, the power density of the raster elements are selected in response to the input heat distribution in step 746. If, however, a vector scanning set up is used, the velocity vector of the source trajectory is derived step 744 along with the optimal lumped source power step 746 as described in relation to FIG. 8. In step 748, the weld head 122 is then actually driven to scan the weld part according to type of scan while its power is modulated to yield the heat input distribution q(t). Then in step 750, the thermal inputs are recorded to a database and then the system waits until the end of the sampling period step 752 when the processing flow returns to step 718 to repeat for another sampling of the infrared emission from the weld part. Once the weld time has expired step 754, then off-line thermal analysis of the infrared images is performed in step 756 along with analysis of the weld bead geometry step 758. Off-line microscopic analysis of the material structure properties step 760 in conjunction with off-line analysis of the mechanical properties step 762 of the joint can suggest methods for improving the strength and characteristics of the weld part.

While this invention has been particularly shown and describe with references to preferred embodiments thereof, it will be understood by those skilled in the art that various changes in form and details may be made therein without departing from the spirit and scope of the invention as defined by the appended claims.

I claim:

1. A welding method comprising:

applying energy to a workpiece from a weld head; and generating a weld pool simultaneously along at least a segment of a weld centerline by scanning the weld head repeatedly along a longitudinal length of the segment and maintaining the weld pool between passes of the weld head.

2. A welding method as described in claim 1, further comprising:

determining an actual temperature field distribution in the weld region; and modifying the scanning of the weld head in response to the actual temperature field distribution.

3. A welding method as described in claim 1, further comprising:

determining an ideal two-dimensional temperature field distribution as a function of welding time that will yield desired weld characteristics;

determining an actual two-dimensional temperature field distribution in the weld region including a weld pool and zones adjacent to the weld pool; comparing the ideal temperature field distribution and the actual temperature field distribution; and modifying the scanning of the weld head to minimize the differences between the actual temperature field distribution and the ideal temperature field distribution.

4. A welding method as described in claim 3, wherein determining the actual temperature field distribution in the weld region comprises detecting electromagnetic radiation emitted by the weld region.

5. A welding method as described in claim 3, wherein the actual temperature field distribution is determined by computer simulation.

6. A welding method as claimed in claim 1, wherein the weld head is one of an arc welding head, laser beam, or electron beam.

7. A welding method as described in claim 1, further comprising scanning the weld held transversely to the weld centerline in the length of the segment to control a two-dimensional heat input distribution in zones adjacent to the weld pool.

8. A welding method as described in claim 1, further comprising scanning the weld head to generate a substantially uniform temperature distribution along the segment.

9. A welding method comprising:

mapping an emissivity of a surface of a workpiece;

determining an ideal temperature field distribution as a function of welding time that will yield desired weld characteristics;

applying energy to a workpiece from a weld head;

detecting electromagnetic radiation emitted by a weld region;

determining a detected temperature field distribution from the detected electromagnetic radiation;

scanning the weld head to minimize the differences between the detected temperature field distribution and the ideal temperature field distribution with corrections made in response to the mapping to generate a weld pool simultaneously along a segment of the weld centerline.

10. A welding method comprising:

determining an ideal temperature field distribution which will yield a weld having desired characteristics along a weld centerline;

determining an actual temperature field distribution in the weld region including a weld pool and zones surrounding the weld pool;

comparing the ideal temperature field distribution and the actual temperature field distribution; and scanning the weld head to minimize differences between the actual temperature field distribution and the ideal temperature field distribution.

11. A welding method as described in claim 10, wherein the ideal temperature field distribution is selected so as to generate a weld pool simultaneously along an entire length of the segment of the weld centerline.

12. A welding method as described in claim 10, further comprising modifying a pattern of the scanning of the weld head in response to the differences between the actual temperature field distribution and the ideal temperature field distribution.

13. A welding method as described in claim 10, further comprising modulating power to the weld head in response to the differences between the actual temperature field distribution and the ideal temperature field distribution during the scanning.

14. A welding method as described in claim 10, further comprising modulating power to the weld head in response to the differences between the actual temperature field distribution and the ideal temperature field distribution while raster scanning the weld head across the weld region.

15. A welding method as described in claim 10, further comprising scanning the weld held transversely to the weld centerline in the length of the segment to control the two-dimensional heat input distribution.

16. A welding method as described in claim 10, further comprising scanning the weld head to generate a substantially uniform temperature distribution along the weld centerline.

17. A welding method comprising:

applying energy to a workpiece from a weld head; and generating a weld pool simultaneously along a weld centerline by scanning the weld head over a weld region surrounding the weld centerline and maintaining the weld pool between passes of the weld head.

18. A welding method as described in claim 17, further comprising:

determining actual temperature field distribution in the weld region; and modifying a pattern of the scanning of the weld head in response to the actual temperature field distribution.

19. A welding method as described in claim 17, further comprising:

determining an ideal temperature field distribution as a function of welding time that will yield desired weld characteristics;

determining an actual temperature field distribution in the weld region;

comparing the ideal temperature field distribution and the actual temperature field distribution; and scanning the weld head to minimize the differences between the actual temperature field distribution and the ideal temperature field distribution.

20. A welding method as described in claim 19, wherein the ideal temperature field distribution is selected so as to generate a weld pool simultaneously along an entire length of the segment of the weld centerline.

21. A welding method as described in claim 19, further comprising modifying a pattern of the scanning of the weld head in response to the differences between the actual temperature field distribution and the ideal temperature field distribution.

22. A welding method as described in claim 19, further comprising modulating power to the weld head in response to the differences between the actual temperature field distribution and the ideal temperature field distribution during the scanning.

23. A welding method as described in claim 19, further comprising modulating power to the weld head in response to the differences between the actual temperature field distribution and the ideal temperature field distribution while raster scanning the weld head across the weld region.

24. A welding method as described in claim 19, wherein determining the actual temperature field distribution in the weld region comprises detecting electromagnetic radiation emitted from the weld region.

25. A welding method as described in claim 19, wherein the actual temperature field distribution is determined by computer simulation to model the welding process.

26. A welding method as described in claim 25, wherein the model is updated in response to the detected temperature field.

27. A welding method as described in claim 17, further comprising scanning the weld held transversely to the weld centerline in the length of the segment to control a two-dimensional heat input distribution.

28. A welding method as described in claim 17, further comprising scanning the weld head to generate a substantially uniform temperature distribution along the weld centerline.

29. A welding apparatus comprising:

a weld head for heating a workpiece;

a scanning device for translating the weld head relative to the workpiece; and a controller for controlling the scanning device to heat the workpiece in a weld region surrounding at least a segment of a weld centerline to form a weld pool simultaneously along an entire length of the segment of the weld centerline and maintain the weld pool between passes of the weld head.

30. A welding apparatus as claimed in claim 29, further comprising an infrared detector for determining a temperature field distribution in the weld region.

31. A welding apparatus as claimed in claim 30, wherein controller modifies a pattern of the scanning of the weld head in response to the temperature field distribution.

32. A welding apparatus as claimed in claim 30, wherein controller modulates the heat output of the weld head in response to the temperature field distribution.

33. A welding apparatus as claimed in claim 29, wherein controller stores an ideal temperature field distribution as a function of welding time that will yield desired weld characteristics.

34. A welding apparatus as claimed in claim 33, further comprising an infrared detector for determining an actual temperature field distribution in the weld region, wherein controller determines an actual temperature field distribution in the weld region, compares the ideal temperature field distribution and the actual temperature field distribution and scans the weld head to minimize the differences between the actual temperature field distribution and the ideal temperature field distribution.

35. A welding apparatus as claimed in claim 34, wherein the controller models the sensitivity of the workpiece to heat input by the weld head and modulates heat output of the weld head in response to the comparison between the ideal temperature field distribution and the actual temperature field distribution and the sensitivity.

36. A welding apparatus as claimed in claim 29, wherein the weld head is an electrode of an arc welding device.

37. A welding apparatus as claimed in claim 29, wherein the weld head is one of an electron or laser beam.

38. A welding apparatus comprising:

a scanning device for translating a weld head relative to a material to be welded; and a controller for controlling the scanning device to heat the material in a weld region surrounding a weld centerline to form a weld pool simultaneously along the weld centerline and maintain the weld pool between passes of the weld head.

39. A welding apparatus as described in claim 38, wherein the controller is constructed to direct the scanning device to translate the weld head longitudinally and transversely to the weld centerline.

40. A welding apparatus as described in claim 38, wherein the controller is constructed to generate a substantially uniform temperature distribution along the weld centerline.

* * * * *